(12) United States Patent
Hattori et al.

(10) Patent No.: US 6,436,334 B1
(45) Date of Patent: *Aug. 20, 2002

(54) PROCESS FOR PRODUCING INORGANIC MOLD

(75) Inventors: Mitsuo Hattori, Ibaragi; Hitoshi Furuta, Sakai; Hirokazu Maeda, Ibaragi, all of (JP)

(73) Assignee: Fuji Oil Company, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 889 days.

(21) Appl. No.: 08/647,562

(22) Filed: May 14, 1996

(30) Foreign Application Priority Data

May 16, 1995 (JP) .............................. 7-116994

(51) Int. Cl.⁷ ............................................. C04B 35/632
(52) U.S. Cl. ...................... 264/669; 106/38.4; 249/134; 264/219
(58) Field of Search .......................... 264/63, 219, 669; 249/134; 106/38.4

(56) References Cited

U.S. PATENT DOCUMENTS

| 2,206,369 | A | * | 7/1940 | Salzberg .................... 106/38.4 |
| 4,203,771 | A | * | 5/1980 | Matsui et al. ............ 106/38.35 |
| 4,265,665 | A | * | 5/1981 | Bedell ........................ 106/38.9 |
| 4,976,903 | A | * | 12/1990 | Matsuhisa et al. ............ 264/63 |
| 5,017,319 | A | | 5/1991 | Shen |
| 5,458,837 | A | | 10/1995 | Roberts et al. |
| 5,587,197 | A | * | 12/1996 | Maeda et al. ................ 426/658 |

FOREIGN PATENT DOCUMENTS

| GB | 845790 | 8/1960 |
| JP | 52 124 416 | 10/1977 |
| JP | 06 057 176 | 3/1994 |

* cited by examiner

*Primary Examiner*—James Derrington
(74) *Attorney, Agent, or Firm*—Wallenstein & Wagner, Ltd.

(57) ABSTRACT

A process for producing inorganic molds involving molding a kneaded mixture containing a particulate inorganic material and water, which process comprises adding water-soluble hemicellulose to the kneaded mixture. The process provides inorganic molds with excellent dispersion stability of the inorganic material particles and improved plasticity, workability including fillability and shape retention, as well as strength.

4 Claims, No Drawings

PROCESS FOR PRODUCING INORGANIC MOLD

BACKGROUND OF THE INVENTION

1. Field of the Invention

The present invention relates to a process for producing inorganic molds as ceramic products, and specifically it relates to a process for producing inorganic molds with satisfactory dispersion stability of the inorganic particles in the kneaded slurry material, and good plasticity, fillability and shape retention.

2. Description of the Related Art

Conventionally known inorganic molds including metal founding sand-cast compositions, amorphous refractories, refractory molds such as fire bricks, etc. and ceramics, are produced by working the pulverized inorganic material together with a water-soluble polymer into a kneaded slurry, forming it into a mold by casting, compression molding, extrusion molding or injection molding, and drying or firing and cooling the mold.

The water-soluble polymer used here must be one which both imparts suitable water retentivity to the inorganic substance and increases the plasticity of the kneaded slurry even when used in small amounts, and which provides satisfactory dispersion stability of the inorganic material particles in the kneaded mixture while improving the wet strength, dry strength and firing strength of the mold. Water-soluble cellulose esters have been the main water-soluble polymers used in the past.

However, although water-soluble cellulose ethers with large average molecular weights can increase the plasticity of kneaded mixtures even in small amounts, their effect is minimal with respect to imparting water retentivity. Conversely, water-soluble cellulose ethers with low average molecular weights must be used in large amounts, which is undesirable due to their adverse effect on the strength and water resistance of the resulting product, and also higher cost.

Further, the effect of water-soluble cellulose ethers of imparting dispersion stability to the inorganic material particles is based mainly on thickening of the water, and is thus minimal. Consequently, while water retentivity and increased plasticity of kneaded mixtures have been achieved by the effect of water-soluble cellulose polymers alone, it has been difficult to ensure dispersion stability of the inorganic particles.

In recent years, microorganically produced polysaccharides, such as pullulan, have been used as water-soluble polymers aimed at overcoming the problems mentioned above, but because these are exceedingly costly, they have not come into general use.

As stated above, though water-soluble polymers as components of inorganic molds must impart pre-drying and pre-firing dispersion stability in the kneaded slurry, plasticity, fillability, shape retention and strength, not all of these properties are provided under the present circumstances.

SUMMARY OF THE INVENTION

It is an object of the present invention to develop a process for producing inorganic molds of which the inorganic material particles are stable in dispersion, and which thus have satisfactory plasticity, fillability and shape retention, and which may also be provided cheaply and consistently.

As a result of diligent research in light of these circumstances, the present inventors have arrived at the discovery that inorganic molds with satisfactory dispersion stability, plasticity, fillability and shape retention may be obtained by using water-soluble hemicellulose, particularly pulse-derived water-soluble hemicellulose, as the water-soluble polymer. The present invention has been completed on the basis of this discovery.

In other words, the present invention provides a process for producing inorganic molds by molding a kneaded mixture containing a particulate inorganic material and water, which process comprises adding water-soluble hemicellulose to the kneaded mixture.

DESCRIPTION OF THE PREFERRED EMBODIMENTS

The water-soluble hemicellulose of the invention is preferably derived from pulse, and especially from soybean, specifically the cotyledon thereof.

Water-soluble hemicellulose of any molecular weight may be used, but the average molecular weight is preferably from a few tens of thousand to a few million, and specifically from 50,000 to one million. The average molecular weight of the water-soluble hemicellulose is determined by the limiting viscosity method whereby the viscosity is measured in a 0.1 M $NaNO_3$ solution, with standard pullulan (available from Showa Denko, KK.) as the standard substance. Here, the uronic acid was measured by the Blumenkrantz method, and the neutral saccharides were measured by GLC after alditol acetating.

Water-soluble hemicellulose may be extracted by water from raw materials containing hemicellulose, or in some cases by heating elution under acidic or alkali conditions, or by elution through decomposition with enzymes. The following is an example of a method for producing water-soluble hemicellulose.

The raw material may be a plant, for example, the shell of an oily seed such as soybean, palm, coconut, corn, cottonseed, etc., usually with the oil and protein removed, or the lees from grains such as rice or wheat, usually with the starch, etc. removed. If soybean is to be used as the raw material, it may be obtained as the bean-curd lees produced during manufacture of tofu, soybean milk or separated soy protein.

The raw material is thermally decomposed under acid or alkali conditions, preferably at a pH near the isoelectric point of the protein, preferably between 80° C. and 130° C. and more preferably between 100° C. and 130° C., and after separation of the water-soluble fraction, it is either dried immediately or dried after being subjected to, for example, active carbon treatment, resin adsorption treatment or ethanol precipitation treatment to remove the hydrophobic substances or low molecular substances, to obtain the water-soluble hemicellulose.

According to the present invention, the water-soluble hemicellulose may be used as a water-soluble polymer alone, but it may also be used in combination with known water-soluble polymers to compensate for the deficiencies of those known water-soluble polymers.

Known synthetic water-soluble polymers which may be mentioned include water-soluble acryl resins, water-soluble styrene-acryl resins, water-soluble styrene-maleic acid resins, etc. and their salt compositions. Water-dispersible emulsions of acryl resins, alkyd resins, vinyl resins, polyester resins, styrene resins, maleic acid resins and urethane resins are examples of other known effective synthetic polymers.

As known natural water-soluble polymers there may be mentioned gum arabic, gum tragacanth, carrageenan, xanthan gum, gelatin, casein sodium, guar gum, tare gum, laver, agar, furcellaran, tamarind seed polysaccharide, karaya gum, Hibiscus manihot, pectin, sodium alginate, pullulan, jellan gum, locust bean gum, whey and other albumins, and various different starches. Semi-natural water-soluble polymers include carboxymethyl cellulose (CMC), methyl cellulose (MC), ethyl cellulose (EC), hydroxymethyl cellulose (HMC), hydroxyethyl cellulose (HEC), hydroxypropyl cellulose (HPC), hydroxyethylmethyl cellulose (HEMC), hydroxyethylethyl cellulose (HEEC), hydroxypropylmethyl cellulose (HPMC), hydroxypropylethyl cellulose (HPEC), hydroxyethylhydroxypropyl cellulose (HEHPC), sulfoethyl cellulose, dihydroxypropyl cellulose (DHPC), alginic acid propylene glycol ester, and processed starches including soluble starches.

The effect of the water-soluble hemicellulose of the invention is sometimes further improved by combining it with one or more of the water-soluble polymers mentioned above, and it may compensate for deficiencies of the various water-soluble polymers.

The inorganic substance composing the inorganic mold of the invention may be a one- to four-component compound made with $SiO_2$, $Al_2O_3$, $Fe_2O_3$, CaO, MgO, $Na_2O$, $K_2O$, $TiO_2$, $P_2O_5$, $B_2O_3$, $SO_3$, etc., and is usually a solid solution, glassy substance or combination thereof, with the inorganic raw materials and amount of water-soluble hemicellulose selected depending on the desired product.

For example, when the inorganic mold used according to the invention is a refractory mold or amorphous refractory, the refractory raw material may be any one commonly used in the fire brick industry, and in the case of silica bricks, red white silica, blue white silica, ganister, white silica, etc. may be used. In the case of zircon and zirconia bricks, a raw material obtained from zircon and baddaleyite minerals may be used. In such cases, the amount of water-soluble hemicellulose used may suitably be in the range of 0.01–1 wt %, and preferably 0.05–0.5 wt %, with respect to the inorganic material.

When the inorganic mold is a ceramic, the raw material may be any one which is commonly used in the ceramic industry, including alumina, silica, zirconia, talc, mica, permiculite, mullite, shirasu, pearlite, feldspar, or a kaolin-based or montmorillonite-based clay. When one of these is used, the amount of water-soluble hemicellulose may suitably be in the range of 1–50 wt %, and preferably 5–30 wt %, with respect to the inorganic material.

When the inorganic mold is a metal founding sand-cast composition, the raw material may be any one which is commonly used in the foundry industry, and a clay such as bentonite or refractory clay may be added to the silica sand or other founding sand. When one of these is used, the amount of water-soluble hemicellulose may suitably be in the range of 0.1–10 wt %, and preferably 0.5–5 wt %, with respect to the inorganic material.

Thus, when water-soluble hemicellulose according to the invention is used as the water-soluble polymer for the raw material of an inorganic mold, a more stable and thoroughly dispersed state may be achieved than by using water-soluble cellulose ethers or pullulan.

Embodiments of the present invention will now be explained by way of the following examples which, however, are merely illustrations and are not intended to restrict the scope of the invention. Throughout the examples, the values for "parts" and "%" all weight-based.
Preparation of soybean hemicellulose To raw bean-curd lees obtained during the production of separated soybean protein there was added twice the amount of water, and the pH was adjusted to 4.5 with hydrochloric acid prior to hydrolysis at 120° C. for 1.5 hours. The cooled product was centrifuged (10,000 G×30 min) and the supernatant and precipitate were separated. The separated precipitate was washed with an equal weight of water and centrifuged, and the supernatant was combined with the previous supernatant, treated with an active carbon column and then dried to obtain water-soluble hemicellulose (A).

This water-soluble hemicellulose was dissolved in 0.5% saline, reprecipitation was repeated 3 times to an ethanol concentration of 50%, and an ion-exchange resin (Amberlite IR-120B, product of Organo, KK.) was used for desalting to obtain water-soluble hemicellulose (B).

The same process was used without active carbon treatment to obtain water-soluble hemicellulose (C).

The results are summarized below.

| | Composition (%) | | |
|---|---|---|---|
| Component | (A) | (B) | (C) |
| Water | 5.71 | 7.75 | 5.10 |
| Crude protein | 1.93 | 1.03 | 5.43 |
| Crude ash | 5.29 | 0.22 | 5.30 |
| Polysaccharides | 87.07 | 91.00 | 84.17 |
| Average molecular weight | 178,000 | 207,000 | 114,000 |

The saccharide compositions of the water-soluble hemicelluloses (A), (B) and (C) were then analyzed according to the following method. The uronic acid was measured by the Blumenkrantz method, and the neutral saccharides were measured by GLC according to the alditol acetate method.

The results were as follows.

| | Saccharide composition (wt%) | | |
|---|---|---|---|
| Saccharide type | (A) | (B) | (C) |
| Uronic acid | 20.4 | 16.9 | 19.4 |
| Rhamnose | 1.6 | 2.7 | 2.1 |
| Fucose | 2.7 | 5.2 | 3.9 |
| Arabinose | 19.9 | 19.2 | 23.1 |
| Xylose | 6.4 | 8.4 | 5.8 |
| Galactose | 47.3 | 46.8 | 43.4 |
| Glucose | 1.8 | 0.9 | 2.3 |

Formation of refractory molds

EXAMPLE 1

After dry blending 100 parts silica, 5 parts dust (with a specific surface area of 120 $m^2/g$), 1 part calcium hydroxide and 0.1 part water-soluble soybean hemicellulose (A) with a kneader, 8 parts of water was added to prepare a kneaded slurry. A 40 mm×40 mm die was packed with 200 g of the kneaded slurry and a hydraulic compressor was used to apply a 1000 $kg/cm^2$ load for compression molding. After 5 minutes the (wet) compressive strength was measured using an Amsler's strength tester. The compression molded sample was dried at 80° C. for 24 hours with an air drier, and then the (dry) compressive strength was measured. The refractoriness was determined according to JISR2204 (method for testing fire brick refractoriness).

EXAMPLE 2

A test was performed in exactly the same manner as Example 1, except that water-soluble soybean hemicellulose (B) was used instead of the water-soluble soybean hemicellulose (A) in Example 1.

EXAMPLE 3

A test was performed in exactly the same manner as Example 1, except that water-soluble soybean hemicellulose (C) was used instead of the water-soluble soybean hemicellulose (A) in Example 1.

EXAMPLE 4

A test was performed in exactly the same manner as Example 1, except that 0.05 part of water-soluble soybean hemicellulose (A) and 0.05 part of hydroxyethylmethyl cellulose (available as SEB-4T by Shinetsu Kagaku, KK.) were used instead of the water-soluble soybean hemicellulose (A) in Example 1.

COMPARATIVE EXAMPLE 1

A test was performed in exactly the same manner as Example 1, except that instead of the water-soluble soybean hemicellulose (A) in Example 1, no water-soluble polymer was used.

COMPARATIVE EXAMPLE 2

A test was performed in exactly the same manner as Example 1, except that hydroxyethylmethyl cellulose was used instead of the water-soluble soybean hemicellulose (A) in Example 1.

The results are shown below for comparison.

|  | Wet compressive strength (kg/cm$^2$) | Dry compressive strength (kg/cm$^2$) | Refractoriness (SK) |
| --- | --- | --- | --- |
| Example 1 | 67.2 | 152 | 34 |
| Example 2 | 68.9 | 154 | 34 |
| Example 3 | 64.7 | 148 | 34 |
| Example 4 | 65.3 | 149 | 34 |
| Comp. Ex. 1 | 29.4 | 43.6 | 34 |
| Comp. Ex. 2 | 58.5 | 118 | 34 |

As shown above, using water-soluble soybean hemicellulose provided improved wet and dry compressive strength after molding, and satisfactory refractory molds after firing.

Formation of amorphous refractories

EXAMPLE 5

After dry blending 56 parts of a combination of zircon sand and zircon flower, 25 parts silica, 4 parts zirconia fine powder, 3 parts of a combination of amorphous silica superfine silica powder and alumina cement, 0.1 part sodium phosphate and 0.1 part water-soluble soybean hemicellulose (A), 12 parts of water was added and the mixture was kneaded to prepare a casting material. The material separation was gauged by measuring the fine powder of the sample and the amount floating on water in a container with a diameter of 100 mm and a height of 200 mm. The flow value and compressive strength (after training at 110° C. for 24 hours) were also measured, and the workability during application was judged by observing the trowel spreading and shape retention. The occurence of cracks after natural drying was also observed.

EXAMPLE 6

A test was performed in exactly the same manner as Example 5, except that water-soluble soybean hemicellulose (B) was used instead of the water-soluble soybean hemicellulose (A) in Example 5.

EXAMPLE 7

A test was performed in exactly the same manner as Example 5, except that water-soluble soybean hemicellulose (C) was used instead of the water-soluble soybean hemicellulose (A) in Example 5.

EXAMPLE 8

A test was performed in exactly the same manner as Example 5, except that 0.5 part of water-soluble soybean hemicellulose (A) and 0.5 part of hydroxypropylmethyl cellulose (available as 90SH-15000 by Shinetsu Kagaku, KK.) were used instead of the water-soluble soybean hemicellulose (A) in Example 5.

EXAMPLE 9

A test was performed in exactly the same manner as Example 5, except that 1 part of water-soluble soybean hemicellulose (A) and 1 part of kibushi clay were used instead of the water-soluble soybean hemicellulose (A) in Example 5.

COMPARATIVE EXAMPLE 3

A test was performed in exactly the same manner as Example 5, except that instead of the water-soluble soybean hemicellulose (A) in Example 5, no water-soluble polymer was used.

COMPARATIVE EXAMPLE 4

A test was performed in exactly the same manner as Example 5, except that hydroxypropylmethyl cellulose was used instead of the water-soluble soybean hemicellulose (A) in Example 5.

The results are shown below for comparison.

|  | Water floating height (mm) | Flow value (mm) | Compressive strength (kg/cm$^2$) | Trowel spreading | Shape retention | Cracking |
| --- | --- | --- | --- | --- | --- | --- |
| Example 5 | 0.5 | 175 | 255 | good | good | none |
| Example 6 | 0.2 | 180 | 263 | good | good | none |
| Example 7 | 0.8 | 182 | 242 | good | good | none |
| Example 8 | 1.2 | 171 | 237 | good | good | none |
| Example 9 | 0.1 | 173 | 258 | good | good | none |
| Comp. Ex. 3 | 4.0 | 198 | 266 | poor | poor | some |
| Comp. Ex. 4 | 3.2 | 166 | 185 | poor | fair | little |

As shown above, using water-soluble soybean hemicellulose provided improved dispersion stability of the particles composing the refractory compositions, to obtain amorphous refractories with satisfactory fluidity and workability with little reduction in strength.

Formation of ceramics

EXAMPLE 10

A mixture of 100 parts of a ceramic material containing 99% alumina, 8 parts of water-soluble soybean hemicellulose (A), 12 parts water and 2 parts stearic acid was heated and kneaded at 60° C., and then crushed into pellets to obtain a molding material, and used for extrusion molding of a panel 3 mm thick, 40 mm wide and 60 mm long at a molding temperature of 80° C. and an extruding pressure of 800 kg/cm³. After degreasing from room temperature to 400° C. at a temperature elevating rate of 1° C./min and removal of the organic materials, the panel was fired at 1700° C. for 5 hours, and the degree of defective sites with swelling or deformities was observed.

EXAMPLE 11

A test was performed in exactly the same manner as Example 10, except that water-soluble soybean hemicellulose (B) was used instead of the water-soluble soybean hemicellulose (A) in Example 10.

EXAMPLE 12

A test was performed in exactly the same manner as Example 10, except that water-soluble soybean hemicellulose (C) was used instead of the water-soluble soybean hemicellulose (A) in Example 10.

EXAMPLE 13

A test was performed in exactly the same manner as Example 10, except that 5 parts of water-soluble soybean hemicellulose (A) and 5 parts of pullulan (average molecular weight 160,000) were used instead of the water-soluble soybean hemicellulose (A) in Example 10.

COMPARATIVE EXAMPLE 5

A test was performed in exactly the same manner as Example 10, except that instead of the water-soluble soybean hemicellulose (A) in Example 10, no water-soluble polymer was used.

COMPARATIVE EXAMPLE 6

A test was performed in exactly the same manner as Example 10, except that pullulan was used instead of the water-soluble soybean hemicellulose (A) in Example 10.

The results are shown below for comparison.

|  | Swelling | Deformity | Foaming |
| --- | --- | --- | --- |
| Example 10 | none | none | none |
| Example 11 | none | none | none |
| Example 12 | none | almost none | none |
| Example 13 | none | none | none |
| Comp.Ex.5 | some | some | little |
| Comp.Ex.6 | some | some | much |

As shown above, using water-soluble soybean hemicellulose provided improved dispersion stability of the ceramic materials, and satisfactory plasticity and post-molding shape retention, thus facilitating the molding and providing excellent fired ceramics with no swelling, deformities or foaming. Formation of metal founding sand-cast compositions

EXAMPLE 14

After dry blending 100 parts silica sand and 1 part water-soluble soybean hemicellulose (A) with a kneader, 5 parts of water was added to prepare founding sand. This was then used to form a 10 mm×10 mm×60 mm test piece according to JISZ2604-1960. The test piece was dried at 150° C. for 15 minutes using an explosion proof constant temperature drier, model 50S-S4A manufactured by Satake Seisakusho, and after cooling at normal temperature the dry flexural strength was measured. The founding sand was also packed by hand into a socket clevis model mold, and after releasing from the mold it was dried for 30 minutes using a drier at 200° C. Founding sand was also used to prepare a master die using a compactor. The socket clevis core formed with the founding sand was placed in the master die for a casting experiment. The teeming was carried out at a melting temperature of 1450° C. and an injection time of 15 seconds. After cooling, the die was removed and the disintegration of the core was observed. The founded product was also checked for the presence of founding defects.

EXAMPLE 15

A test was performed in exactly the same manner as Example 14, except that water-soluble soybean hemicellulose (B) was used instead of the water-soluble soybean hemicellulose (A) in Example 14.

EXAMPLE 16

A test was performed in exactly the same manner as Example 14, except that water-soluble soybean hemicellulose (C) was used instead of the water-soluble soybean hemicellulose (A) in Example 14.

EXAMPLE 17

A test was performed in exactly the same manner as Example 14, except that 0.5 part of water-soluble soybean hemicellulose (A) and 0.5 part of pullulan (average molecular weight 185,000) were used instead of the water-soluble soybean hemicellulose (A) in Example 14.

COMPARATIVE EXAMPLE 7

A test was performed in exactly the same manner as Example 14, except that polyvinyl alcohol was used instead of the water-soluble soybean hemicellulose (A) in Example 14.

COMPARATIVE EXAMPLE 8

A test was performed in exactly the same manner as Example 14, except that pullulan was used instead of the water-soluble soybean hemicellulose (A) in Example 14.

The results are shown below for comparison.

|  | Molded condition of test piece | Dry flexural strength (kg/cm³) | Ease of die removal | Founding defects in founded product |
| --- | --- | --- | --- | --- |
| Example 14 | good | 44.9 | good | none |
| Example 15 | good | 45.6 | good | none |
| Example 16 | good | 44.3 | good | none |
| Example 17 | good | 40.3 | good | none |
| Comp.Ex.7 | poor | 22.4 | poor | some |
| Comp.Ex.8 | good | 38.6 | fair | little |

As shown above, using water-soluble hemicellulose improved the moldability and strength of founding sand, and provided metal founding sand-cast compositions with excellent workability, including removal of the die, and little occurrence of founding defects.

Thus, when water-soluble hemicellulose is used to produce an inorganic mold, the dispersion stability of the organic substance as the main raw material is improved, and the plasticity of the mold, its workability including fillability and shape retention, and its strength are all satisfactory. As a result it becomes possible to obtain high-quality inorganic molds which have low defect rates even upon completion of the final products, and this helps to improve productivity.

What is claimed is:

1. A process for producing an inorganic mold by molding of a kneaded mixture containing a particulate inorganic material and water, which process comprises extracting water-soluble hemicellulose from soybeans under acidic conditions at a pH near the isoelectric point of soybean protein, and adding said water-soluble hemicellulose to said kneaded mixture.

2. A process according to claim 1, wherein the mold is a fired mold, a metal founding sand-cast composition, or an amorphous refractory.

3. A process according to claim 2, wherein the fired mold is a refractory mold or ceramic.

4. A process for producing an inorganic mold by molding of a kneaded mixture containing a particulate inorganic material and water, which process comprises extracting water-soluble hemicellulose from soybeans under acidic conditions at a pH near the isoelectric point of soybean protein, and adding said water-soluble hemicellulose to said kneaded mixture, wherein the saccharide of said hemicellulose includes uronic acid in an amount at least 16.9% by weight of said saccharide.

\* \* \* \* \*